(12) United States Patent
Lee et al.

(10) Patent No.: US 8,870,394 B2
(45) Date of Patent: Oct. 28, 2014

(54) ANTI-FOG HEAT GENERATING GLASS SYSTEM AND METHOD FOR CONTROLLING THE SAME

(75) Inventors: Dong-Il Lee, Anyang-si (KR);
Beom-Goo Son, Hwaseong-si (KP);
Il-Joon Bae, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 68 days.

(21) Appl. No.: 13/393,842

(22) PCT Filed: Dec. 23, 2010

(86) PCT No.: PCT/KR2010/009289
§ 371 (c)(1),
(2), (4) Date: Mar. 2, 2012

(87) PCT Pub. No.: WO2011/078607
PCT Pub. Date: Jun. 30, 2011

(65) Prior Publication Data
US 2012/0170120 A1 Jul. 5, 2012

(30) Foreign Application Priority Data
Dec. 24, 2009 (KR) ........................ 10-2009-0131101

(51) Int. Cl.
*G02B 7/18* (2006.01)
*G02B 5/124* (2006.01)
*H05B 3/84* (2006.01)
(52) U.S. Cl.
CPC ...................................... *H05B 3/84* (2013.01)
USPC .......................................... 359/512; 359/514
(58) Field of Classification Search
USPC ....................................................... 359/512
See application file for complete search history.

(56) References Cited

U.S. PATENT DOCUMENTS

| 3,995,140 A | 11/1976 | Kuiff et al. |
| 6,049,069 A * | 4/2000 | Hochstein ...................... 219/497 |
| 6,625,875 B2 * | 9/2003 | Sol ................................... 29/621 |
| 2005/0178200 A1 * | 8/2005 | Stauss et al. ............... 73/335.02 |
| 2007/0235549 A1 | 10/2007 | Nakajima |
| 2008/0076087 A1 * | 3/2008 | Horie et al. ..................... 433/29 |

FOREIGN PATENT DOCUMENTS

| CN | 101055208 A | 10/2007 |
| JP | H07196341 A | 8/1995 |
| JP | 2002513507 A | 5/2002 |
| JP | 2004-189155 A | 7/2004 |

(Continued)

*Primary Examiner* — Jade R Chwasz
(74) *Attorney, Agent, or Firm* — Nath, Goldberg & Meyer; Jerald L. Meyer

(57) ABSTRACT

An anti-fog heat-generating glass system, comprising: a heat-generating glass unit separating an indoor and outdoor area, including general glass and heat-generating glass; a glass surface temperature-sensing unit arranged on indoor side heat-generating glass for sensing glass surface temperature; a control unit which compares the glass surface temperature and a fogging point of the indoor area to control heat-generation of the heat-generating glass unit; and a power-source unit supplying power to the heat-generating glass system to operate the system. A method for controlling the anti-fog heat-generating glass system comprises: simultaneously sensing the temperature and relative humidity of the indoor area and the temperature of the heat-generating glass surface; calculating a fogging point based on the temperature and relative humidity of the indoor area; comparing the temperatures of the heat-generating glass surface and the fogging point; and returning to the sensing step or heating the heat-generating glass, based on the comparing step.

6 Claims, 3 Drawing Sheets

(56) References Cited

FOREIGN PATENT DOCUMENTS

| | | |
|---|---|---|
| JP | 2005-256420 A | 9/2005 |
| JP | 2007-188687 A | 7/2007 |
| JP | 2007329116 A | 12/2007 |
| KR | 10-1998-0056388 A | 9/1998 |
| KR | 10-2004-0033478 A | 4/2004 |
| KR | 10-2005-0011494 A | 1/2005 |
| KR | 10-2006-0035895 A | 4/2006 |
| KR | 10-2009-0047834 A | 5/2009 |
| SU | 506282 A3 | 3/1976 |
| SU | 934902 A4 | 6/1982 |

\* cited by examiner

US 8,870,394 B2

ANTI-FOG HEAT GENERATING GLASS SYSTEM AND METHOD FOR CONTROLLING THE SAME

This is a National Application filed under 35 U.S.C. 371 as a national stage of PCT/KR2010/009289, filed Dec. 23, 2010, and claiming the benefit from Korean Application No. 10-2009-0131101, filed Dec. 24 2009, the content of each of which is hereby incorporated by reference in its entirety.

TECHNICAL FIELD

The present invention relates to an anti-fog heat generating glass system and a method for controlling the same, and more particularly, to an anti-fog heat generating glass system and a method for controlling the same, which allows electric power to be supplied to a heat generating glass sheet so as to generate heat when the surface temperature of the heat generating glass sheet is less than or equal to a dew point of an indoor area, or otherwise, prevents the power from being supplied to the heat generating glass sheet so as not to generate heat under automatic control of the heat generating glass system, thereby effectively preventing condensation on the surface of the indoor side of the heat generating glass sheet and reducing power consumption.

BACKGROUND ART

In a building, a glass sheet (windows and doors) is a basic component.

Conventionally, in winter, there has been a problem of dew condensation due to difference between indoor temperature and outdoor temperature. The dew condensation on the glass not only causes bad visibility, but also causes a lower wall to become damp and moldy.

To solve such problems, studies have been conducted to develop technology for preventing dew condensation on a heat generating glass sheet due to difference between indoor temperature and outdoor temperature in winter in order to guarantee visibility, and various products have been produced using such technology.

A heat generating glass system uses a method for maintaining a heat generating glass sheet at a predetermined temperature or higher in order to prevent condensation thereon in winter. However, although condensation occurs only when the surface temperature of the glass is less than or equal to a dew point determined according to the temperature and relative humidity of an indoor area, the conventional heat generating glass sheet is configured to maintain the surface temperature of the glass constant, thereby causing undesired power consumption.

DISCLOSURE

Technical Problem

Therefore, the present invention is directed to solving the problems as described above, and provides an anti-fog heat generating glass system in which the surface temperature of a heat generating glass sheet is sensed by a glass surface temperature detector attached to an indoor side of the heat generating glass sheet and temperature and humidity of an indoor area are measured to calculate the dew point, so that electric power may be supplied to the heat generating glass sheet only when the surface temperature of the heat generating glass sheet is less than or equal to the dew point, thereby preventing condensation and minimizing power consumption.

The present invention also provides a method for controlling anti-fog heat generating glass sheet using the anti-fog heat generating glass system.

Technical Solution

An aspect of the present invention provides an anti-fog heat generating glass system, which includes: a heat generating glass unit separating an indoor area from an outdoor area, and including a general glass sheet and a heat generating glass sheet; a glass surface temperature detector disposed on an indoor side of the heat generating glass sheet to sense a surface temperature of the heat generating glass sheet; a controller comparing the surface temperature of the heat generating glass sheet with a dew point of the indoor area and controlling heat generation of the heat generating glass unit; and a power source supplying electric power to the heat generating glass system to operate the system.

The controller may include: a power input unit supplying power to the controller; an ambient environment detector sensing temperature and relative humidity of the indoor area; and a heat generating glass actuator calculating a dew point of the indoor area, comparing the dew point with the surface temperature of the heat generating glass sheet, and controlling operation of the heat generating glass sheet.

The controller may further include: a setting input unit allowing a user to set a temperature for the heat generating glass sheet such that the temperature of the heat generating glass sheet can be kept constant, and to select an automatic mode or a manual mode of the heat generating glass system.

The system may further include an indicator displaying an operating state of the heat generating glass system.

The controller may control the heat generating glass sheet to be heated when the surface temperature of the heat generating glass sheet sensed by the glass surface temperature detector is less than or equal to a dew point calculated based on the sensed temperature and relative humidity of the indoor area.

Another aspect of the present invention provides a method for controlling an anti-fog heat generating glass system, which includes: simultaneously sensing temperature and relative humidity of an indoor area and a surface temperature of heat generating glass sheet; calculating a dew point based on the temperature and relative humidity of the indoor area; comparing the surface temperature of the heat generating glass sheet and a temperature of the dew point; and returning to the simultaneously sensing temperature and relative humidity, or heating the heat generating glass sheet, according to a result of comparison of the surface temperature of the heat generating glass sheet with the temperature of the dew point.

The heating the heat generating glass sheet may be performed when the surface temperature of the heat generating glass sheet is less than or equal to the dew point, and the returning to the simultaneously sensing temperature and relative humidity may be performed when the surface temperature of the heat generating glass sheet is higher than the dew point.

Advantageous Effects

According to exemplary embodiments of the invention, an anti-fog heat generating glass system and a method for controlling the same may allow electric power to be supplied to a heat generating glass sheet only when a surface temperature sensed by a glass surface temperature detector attached to an indoor side of the heat generating glass sheet is less than or equal to a dew point calculated based on temperature and relative humidity of an indoor area, so that the surface temperature is be automatically controlled to prevent dew condensation.

In addition, prevention of condensation on the heat generating glass sheet protects a lower wall of a window and a door from mold, thereby keeping the glass permanently clean while improving visibility of the glass.

Further, the system may be operated only when the surface temperature of the heat generating glass sheet is lower than the dew point, thereby significantly reducing power consumption as compared with conventional systems that maintain a constant temperature.

BRIEF DESCRIPTION OF REFERENCE NUMERALS IN THE DRAWINGS

Figure 1:
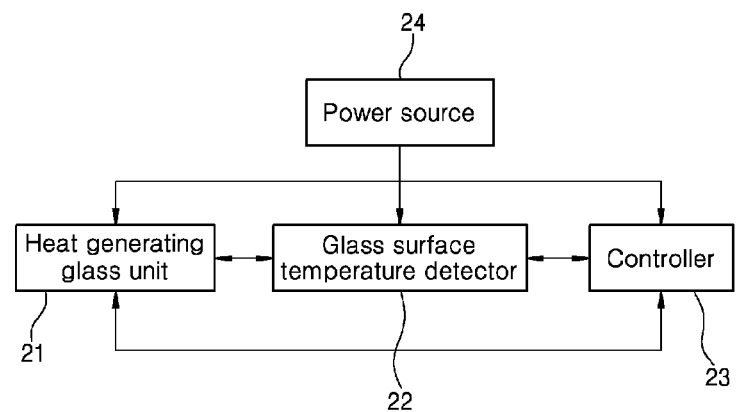
FIG. 1 is a schematic view of an anti-fog heat generating glass system according to an exemplary embodiment of the present invention.

20: anti-fog heat generating glass system
21: heat generating glass unit
22: glass surface temperature detector
23: controller
24: power source

BEST MODE

Exemplary embodiments of the present invention will now be described in detail with reference to the accompanying drawings. It should be understood that the present invention is not limited to the following embodiments and may be embodied in various ways. The scope of the invention is limited by the accompanying claims and equivalents thereof. Like elements will be indicated by like reference numerals throughout the specification.

FIG. 1 is a schematic view of an anti-fog heat generating glass system according to an exemplary embodiment of the present invention.

The anti-fog heat generating glass system 20 according to the exemplary embodiment includes a heat generating glass unit 21, which separates an indoor area from an outdoor area and includes a general glass sheet 211 and a heat generating glass sheet 212; a glass surface temperature detector 22 disposed on an indoor side of the heat generating glass sheet so as to sense a surface temperature of the heat generating glass sheet; a controller 23 which compares the surface temperature of the heat generating glass sheet with a dew point of the indoor area so as to control heat generation of the heat generating glass unit 21; and a power source 24 which supplies electric power to the heat generating glass system so as to operate the system.

The heat generating glass unit 21 separates the indoor area from the outdoor area, and includes the general glass sheet 211 and the heat generating glass sheet 212, so that heat can be generated by the heat generating glass sheet 212 in accordance with supply of electric power, thereby preventing condensation from occurring on the indoor side of the heat generating glass sheet 212. The detailed structure of the heat generating glass unit 21 will be described below with reference to FIG. 2.

The glass surface temperature detector 22 is disposed on the indoor side of the heat generating glass sheet and senses the surface temperature thereof. The glass surface temperature detector 22 employs a temperature sensor to sense change in temperature on the surface of the heat generating glass sheet. The temperature sensor in this exemplary embodiment may be selected from among any kind of temperature sensor in the art. The surface temperature of the glass sensed by the temperature sensor is input to a heat generating glass actuator 234 of the controller 23 described below.

The controller 23 compares the surface temperature of the heat generating glass sheet and the dew point of the indoor area and controls heat generation of the heat generating glass sheet. The temperature sensed by the glass surface temperature detector 22 is compared with the dew point calculated based on the temperature and relative humidity of the indoor area measured by an ambient environment detector 233. If the surface temperature of the heat generating glass sheet is less than or equal to the dew point, the controller 23 allows the heat generating glass to heat up, thereby previously preventing condensation.

The dew point is a factor determined in accordance with the temperature and relative humidity in addition to pressure. If the temperature and relative humidity of the indoor area vary depending on various environmental conditions, such variation also causes variation of the dew point of the indoor area.

Conventionally, when the temperature of the heat generating glass sheet is set to a predetermined temperature (hereinafter, referred to as a 'set temperature'), the heat generating glass sheet does not correspond to variation of the dew point of the indoor area. For example, if the set temperature is higher than the dew point of the indoor area, undesired power consumption occurs. On the other hand, if the set temperature is lower than the dew point of the indoor area, it is difficult to achieve its original purpose of preventing condensation.

According to an exemplary embodiment, the dew point of the indoor area may be calculated through the controller including the ambient environment detector for sensing the temperature and relative humidity of the indoor area, thereby properly coping with variation in dew point of the indoor area. Thus, it is possible not only to reduce undesired power consumption, but also to efficiently prevent condensation.

Next, the controller 23 will be described in detail with reference to FIG. 4.

The power source 24 supplies electric power, so that the heat generating glass unit 21 can generate heat on the heat generating glass sheet, the temperature sensor of the glass surface temperature detector 22 can operate, and the controller 23 can control the system. In this exemplary embodiment, the power source 24 may be selected among any kind of power source capable of supplying power, for example, a direct current (DC) power source such as a battery, an alternating current (AC) power source such as a general power line, etc.

Figure 2:
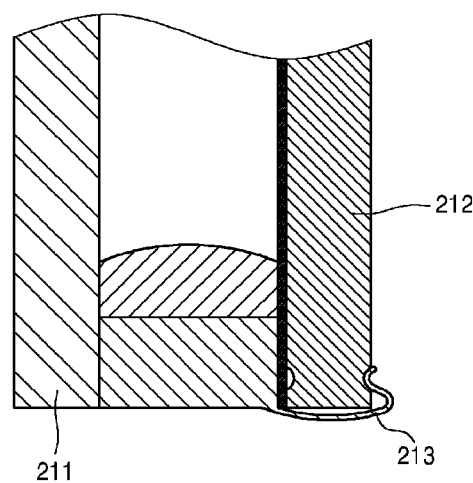
FIG. 2 is a side sectional view of a heat generating glass unit of the heat generating glass system according to the exemplary embodiment of the present invention.
Figure 3:
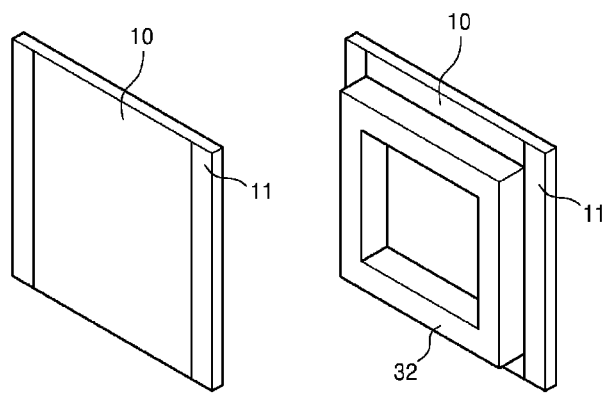
FIG. 3 is an exploded perspective view of the heat generating glass system according to the exemplary embodiment of the present invention.

FIG. 2 is a side sectional view of a heat generating glass unit of the heat generating glass system, and FIG. 3 is an exploded perspective view of the heat generating glass system.

As shown therein, the heat generating glass unit 21 includes the general glass sheet 211 and the heat generating glass sheet 212.

Here, the general glass sheet 211 is disposed at an outdoor side and the heat generating glass sheet 212 is disposed at an indoor side.

The general glass sheet 211 may include plate glass shaped like a pane and may have a thin metal or metal oxide coating on the surface thereof. Here, an energy-saving glass sheet capable of minimizing heat transfer, i.e. a low-emissivity glass sheet, may be used as the general glass sheet 211.

The heat generating glass sheet 212 may include a transparent conductive-coating.

Here, the transparent conductive-coating glass sheet may be selected from conductive glass sheets coated with various metal oxides such as fluorine-doped tin oxide, indium tin oxide, and the like.

As such, if the transparent conductive-coating glass sheet is used as the heat generating glass sheet 212, heat may be uniformly generated over the glass sheet and transparency may be guaranteed, thereby ensuring visibility.

The heat generating glass sheet 212 may be provided with an electrode that receives electricity and generates heat.

The electrode 213 may include a conductive bus bar formed by applying Ag paste to opposite ends of the heat generating glass sheet 212. When the electrode is provided in the form of the conductive bus bar, a power line is connected to the bus bar by soldering such that electric power can be supplied to the heat generating glass sheet 212 through the power line. In addition to soldering for connecting the power line with the bus bar, a chip shaped conductive electrode may be connected to the bus bar to supply electric power to the heat generating glass sheet 212. In particular, such a clip shaped electrode may be mounted so as to surround opposite sides of the heat generating glass sheet 212 on which the Ag paste is not deposited.

The heat generating glass unit 21 including the heat generating glass sheet 212 and the general glass sheet 211 may be manufactured by a general method for manufacturing multi-layer glass. Particularly, a thermo plastic spacer (TPS) and a secondary sealer may be used to join the heat generating glass sheet 212 to the general glass sheet 211.

Figure 4:
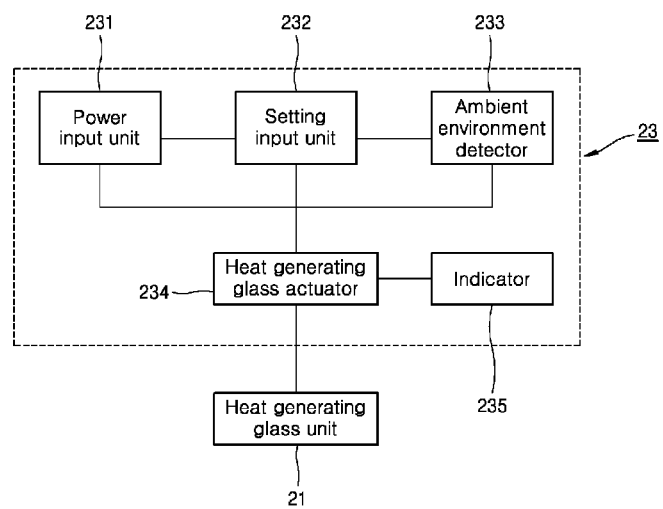
FIG. 4 is a block diagram of a controller of the anti-fog heat generating glass system according to the exemplary embodiment of the present invention.

FIG. 4 is a block diagram of the controller of the anti-fog heat generating glass system according to the exemplary embodiment of the present invention.

The controller 23 for controlling heat generation of the heat generating glass sheet includes a power input unit 231, a setting input unit 232, the ambient environment detector 233, the heat generating glass actuator 234, and an indicator 235 displaying an operating state of the system.

The power input unit 231 receives electric power from the power source 24 of the system and allows the controller 23 to operate.

The setting input unit 232 allows the controller 23 to set up a mode for the heat generating glass system and control the system to operate in accordance with the setting mode. In an automatic mode, the surface temperature of the heat generating glass sheet is compared with the dew point of the indoor area and heat is generated on the heat generating glass sheet, when the surface temperature of the heat generating glass sheet is less than or equal to the dew point, thereby preventing condensation. On the other hand, a user may select a manual mode through the setting input unit 232 and input a desired temperature for the surface of the heat generating glass sheet. In the manual mode, the surface temperature of the heat generating glass sheet may be kept constant at the set temperature input by a user through the setting input unit 232 as in the art. Consequently, the operating mode of the heat generating glass system may be selected through the setting input unit 232 of the controller 23. Particularly, in the manual mode, it is possible to set a constant temperature of the heat generating glass sheet.

The ambient environment detector 233 senses the temperature and relative humidity of the indoor area where the controller 23 is placed. The ambient environment detector may separately include a temperature sensor and a humidity sensor for sensing temperature and humidity, respectively. Alternatively, the ambient environment detector 233 may employ a thermo-hygrometer, to which the temperature sensor and the humidity sensor are integrated. The temperature sensor for sensing the temperature of the indoor area, and the humidity sensor for sensing the amount of water vapor in air may be selected from the art.

The heat generating glass actuator 234 receives the temperature and relative humidity sensed by the ambient environment detector 233 and calculates a dew point when a user selects the automatic mode for the heat generating glass system 20 through the setting input unit 232. Then, the heat generating glass actuator 234 compares the calculated dew point with the surface temperature of the heat generating glass sheet sensed by the glass surface temperature detector 22, and supplies electric power to the heat generating glass unit when the surface temperature of the heat generating glass sheet is less than or equal to the dew point, thereby generating heat on the heat generating glass sheet. If a user selects the manual mode for the heat generating glass system, the heat generating glass actuator 234 compares the sensed surface temperature of the heat generating glass sheet with a user set temperature and controls heat generation of the heat generating glass sheet so that the surface temperature of the heat generating glass sheet can be kept at the user set temperature.

The indicator 235 displays whether the anti-fog heat generating glass system 20 operates and may be disposed on the controller 23 to indicate whether the system is currently in the automatic mode or in the manual mode while displaying whether the system operates or not. In the manual mode, the indicator 235 may be provided in the form of a display capable of displaying a user set temperature for the heat generating glass sheet. In addition, the indicator 235 may indicate whether the heat generating glass sheet is currently being heated.

Figure 5:
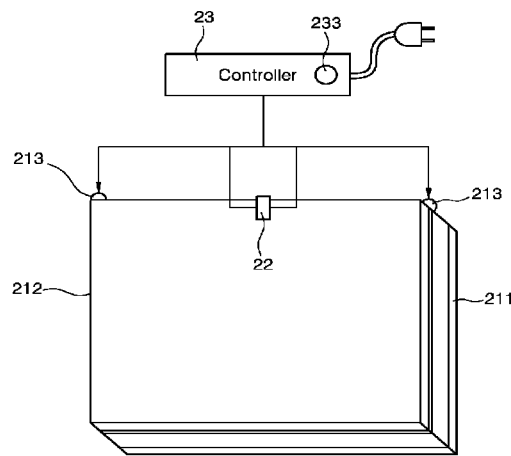
FIG. 5 illustrates an overall appearance of the heat generating glass system according to the exemplary embodiment of the present invention.

FIG. 5 illustrates an overall appearance of the heat generating glass system according to the exemplary embodiment of the present invention.

The controller 23 is placed in an indoor area, connected to an external power source, and is also connected to the heat generating glass unit 21 and the glass surface temperature detector 22. The controller 23 includes the ambient environment detector 233 for sensing the temperature and relative humidity of the indoor area, and also includes the indicator (not shown) for allowing a user to see the operating state of the system and the setting input unit (not shown) for setting the system mode.

The heat generating glass unit 21 includes the general glass sheet 211 constituting the outdoor side, and the heat generating glass sheet 212, which constitutes the indoor side and is formed with a conductive glass coating surface facing toward the general glass. An external power source is supplied to the heat generating glass unit 21 through the electrode 213. The space between the general glass sheet 211 and the heat generating glass sheet 212 may be filled with a thermo plastic spacer (TPS) and a secondary sealer.

The glass surface temperature detector 22 is attached to the indoor side of the heat generating glass sheet, senses the surface temperature thereof, and transmits a sensed value to the controller 23.

Thus, the anti-fog heat generating glass system operates based on the temperature and relative humidity of the indoor side sensed by the ambient environment detector 233 and the surface temperature of the glass sensed by the glass surface temperature detector 22.

Figure 6:
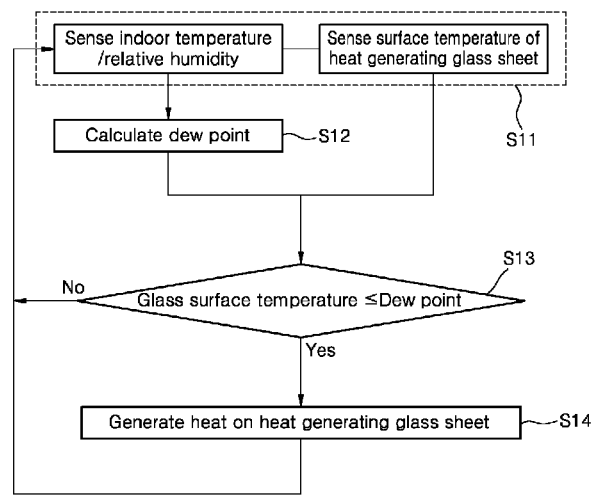
FIG. 6 is a flowchart of a method for controlling an anti-fog heat generating glass system in an automatic mode according to an exemplary embodiment of the present invention.

FIG. 6 is a flowchart of a method for controlling an anti-fog heat generating glass system according to an exemplary embodiment.

In particular, FIG. 6 is a flowchart of a method for controlling the system in an automatic mode. First, the ambient environment detector 233 of the controller 23 senses the temperature and relative humidity of the indoor area, and at the same time the glass surface temperature detector 22 senses the surface temperature of the heat generating glass sheet (S11). The heat generating glass actuator 254 calculates the dew point based on the temperature and relative humidity of the indoor area sensed in S11 (S12). Then, the heat generating glass actuator 254 compares the calculated dew point with the surface temperature of the heat generating glass sheet sensed by the glass surface temperature detector 22 (S13). If the surface temperature of the glass is less than or equal to the dew point, the heat generating glass sheet is heated (S14). If the surface temperature of the glass is higher than the dew point, it returns to operation in S11. After heating the heat generating glass sheet in S14, the process returns to operation in S11. Eventually, after the surface temperature of the glass is compared with the dew point (S13), there is provided a loop of heating the heat generating glass sheet, or not heating the heat generating glass sheet, or returning to operation in S11, thereby enabling continuous detection of the surface temperature of the heat generating glass sheet and the temperature and humidity of the indoor area while preventing condensation on the heat generating glass sheet.

Although some embodiments have been provided to illustrate the present invention, it will be apparent to those skilled in the art that the embodiments are given by way of illustration only, and that various modifications and equivalent embodiments can be made without departing from the spirit and scope of the present invention. Accordingly, the scope of the present invention should be limited only by the accompanying claims and equivalents thereof.

The invention claimed is:

1. An anti-fog heat generating glass system, comprising:
    a heat generating glass unit separating an indoor area from an outdoor area and including a general glass sheet and a heat generating glass sheet separate from the general glass sheet, said heat generating glass sheet having a transparent conductive coating layer formed on one side thereof;
    a glass surface temperature detector disposed on an indoor side of the heat generating glass sheet to sense a surface temperature of the heat generating glass sheet;
    a controller comparing the surface temperature of the heat generating glass sheet with a calculated dew point of the indoor area and controlling heat generation of the heat generating glass unit,
    wherein said controller includes a power input unit supplying power to the controller,
    an ambient environment detector sensing temperature and relative humidity of the indoor area, and
    wherein said controller controls the heat generating glass sheet to be heated when the surface temperature of the heat generating glass sheet sensed by the glass surface temperature detector is less than or equal to a dew point calculated based on a sensed temperature and the relative humidity of the indoor area;
    a heat generating glass actuator calculating a dew point of the indoor area, comparing the dew point with the surface temperature of the heat generating glass sheet, and controlling operation of the heat generating glass sheet; and
    a power source supplying electric power to the heat generating glass system to operate the system.

2. The system of claim 1, wherein the controller further comprises: a setting input unit allowing a user to set a temperature for the heat generating glass sheet such that the temperature of the heat generating glass sheet can be kept constant, and to select an automatic mode or a manual mode of the heat generating glass system.

3. The system of claim 1, further comprising: an indicator displaying an operating state of the heat generating glass system.

4. The system of claim 1, wherein the transparent conductive coating layer comprises a metal oxide.

5. A method for controlling an anti-fog heat generating glass system, comprising:
    simultaneously sensing temperature and relative humidity of an indoor area and a surface temperature of a heat generating glass sheet separate from a general glass sheet;
    calculating a dew point based on the temperature and relative humidity of the indoor area;
    comparing the surface temperature of the heat generating glass sheet and the calculated temperature of the dew point; and
    returning to the simultaneously sensing temperature and relative humidity, or heating the heat generating glass sheet, according to a result of comparison of the surface temperature of the heat generating glass sheet with the temperature of the dew point.

6. The method of claim 5, wherein the heating the heat generating glass sheet is performed when the surface temperature of the heat generating glass sheet is less than or equal to the dew point, and the returning to the simultaneously sensing temperature and relative humidity is performed when the surface temperature of the heat generating glass sheet is higher than the dew point.

* * * * *